United States Patent
Banno

(10) Patent No.: US 8,445,396 B2
(45) Date of Patent: May 21, 2013

(54) DIELECTRIC CERAMIC AND LAMINATED CERAMIC CAPACITOR

(75) Inventor: Koichi Banno, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 28 days.

(21) Appl. No.: 13/225,838

(22) Filed: Sep. 6, 2011

(65) Prior Publication Data

US 2012/0075770 A1    Mar. 29, 2012

(30) Foreign Application Priority Data

Sep. 28, 2010   (JP) ................. 2010-216926

(51) Int. Cl.
*C04B 35/468*    (2006.01)

(52) U.S. Cl.
USPC .............. 501/138; 501/139; 361/321.4

(58) Field of Classification Search
USPC ................ 501/138, 139; 361/321.4
See application file for complete search history.

(56) References Cited

U.S. PATENT DOCUMENTS

| | | | |
|---|---|---|---|
| 6,245,433 B1 | 6/2001 | Nakamura et al. | |
| 7,160,827 B2 * | 1/2007 | Banno ..................... | 501/138 |

| | | | |
|---|---|---|---|
| 2007/0254799 A1 | 11/2007 | Kaneda et al. | |
| 2008/0226927 A1 | 9/2008 | Kaneda et al. | |
| 2009/0149312 A1 | 6/2009 | Aman et al. | |

FOREIGN PATENT DOCUMENTS

| | | |
|---|---|---|
| JP | 11-322414 A | 11/1999 |
| JP | 2001-338828 A | 12/2001 |
| JP | 2005-033070 A | 2/2005 |
| JP | 2005-243890 A | 9/2005 |
| JP | 2007-297258 A | 11/2007 |
| JP | 2008-162830 A | 7/2008 |
| JP | 2008-162862 A | 7/2008 |
| JP | 2008-174434 A | 7/2008 |
| JP | 2008-179492 A | 8/2008 |
| JP | 2008-179493 A | 8/2008 |
| JP | 2008201616 A | 9/2008 |
| JP | 2009-143735 A | 7/2009 |

\* cited by examiner

*Primary Examiner* — Karl Group
(74) *Attorney, Agent, or Firm* — Dickstein Shapiro LLP

(57) ABSTRACT

A laminated ceramic capacitor suitable for intermediate to high voltage applications uses a dielectric ceramic represented by $\{100(BaTiO_3+aBaZrO_3)+bR+cMg+dMn+eSi\}$ where R is a rare earth element; $0 \leq a \leq 0.2$, $8.0 \leq b \leq 12.0$, $1.0 \leq c \leq 10.0$, $0.1 \leq d \leq 3.0$, and $1.0 \leq e \leq 10.0$, and includes first grains of 0.7 μm or more in grain size and an average first grain size (Aave) and area ratio of the ceramic (SA), and second grains of 0.6 μm or less in grain size and an average second grain size (Bave) and area ratio (SB), $0.8$ μm$\leq$Aave$\leq 2.0$ μm, $0.1$ μm$\leq$Bave$\leq 0.5$ μm, Aave/Bave$\geq 3.0$, $0.3 \leq SA \leq 0.9$, $0.1 \leq SB \leq 0.7$, and $0.8 \leq SA+SB \leq 1.0$.

16 Claims, 1 Drawing Sheet

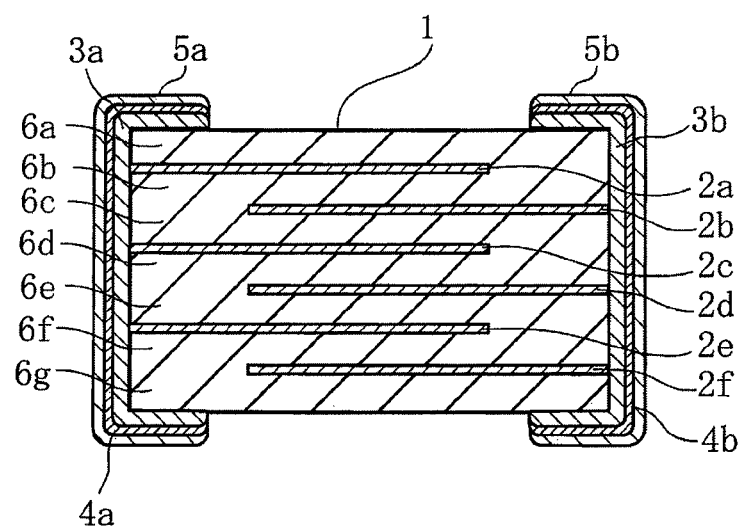

DIELECTRIC CERAMIC AND LAMINATED CERAMIC CAPACITOR

BACKGROUND OF THE INVENTION

1. Field of the Invention

The present invention relates to a dielectric ceramic and a laminated ceramic capacitor, and more particularly, to a dielectric ceramic containing a barium titanate based compound as its main constituent and a laminated ceramic capacitor using the dielectric ceramic, in particular, a small-sized and high-capacitance laminated ceramic capacitor suitable for intermediate to high voltage applications, which has a high rated voltage.

2. Description of the Related Art

Conventionally, barium titanate based compounds which have a high dielectric constant have been widely known as ceramic materials for use in laminated ceramic capacitors. In addition, inexpensive base metal materials such as Ni, which have favorable electrical conductivity, have been widely used as internal electrode materials.

With the development of electronics technology in recent years, a reduction in size and increase in capacitance of laminated ceramic capacitors have rapidly advanced.

This type of ceramic capacitor has a ceramic sintered body obtained by alternately stacking dielectric layers composed of a dielectric ceramic and internal electrodes, and applying a firing treatment, and has external electrodes formed on both ends of the ceramic sintered body. Reducing the dielectric layer thickness and increasing the number of layers stacked allows for the reduction in size and the increase in capacitance of the laminated ceramic capacitors.

Japanese Patent Application Laid-Open No. 2008-162830 proposes a dielectric ceramic composition which has a main constituent including barium titanate, a first accessory constituent containing $BaZrO_3$, a second accessory constituent containing an oxide of Mg, a third accessory constituent containing an oxide of a specific rare earth element R, a fourth accessory constituent containing an oxide of Mn or the like, a fifth accessory constituent containing an oxide of Si or the like, and a sixth accessory constituent containing an oxide of Al, in which the ratios of the respective accessory constituents with respect to 100 mol of the main constituent are as follows in terms of oxide or composite oxide: the first accessory constituent: 9 to 13 mol; the second accessory constituent: 2.7 to 5.7 mol; the third accessory constituent: 4.5 to 5.5 mol; the fourth accessory constituent: 0.5 to 1.5 mol; the fifth accessory constituent: 3.0 to 3.9 mol; and the sixth accessory constituent: 0.5 to 1.5 mol.

In Japanese Patent Application Laid-Open No. 2008-162830, the main constituent including barium titanate contains the sixth accessory constituent in a predetermined amount in addition to the first to fifth accessory constituents, thereby achieving a highly-accelerated life test result of 10 hours or more.

SUMMARY OF THE INVENTION

In order to achieve the reduction in size and the increase in capacitance for laminated ceramic capacitors, the dielectric layers needs to be reduced in thickness and increased in the number of layers stacked, as described above. In addition to the dielectric layers reduction in thickness and increase in number of layers stacked, the laminated ceramic capacitors are required to have favorable reliability in terms of lifetime characteristics even when a high electric field is applied.

However, the Japanese Patent Application Laid-Open No. 2008-162830 ceramic achieves a lifetime characteristic on the order of 12 to 34 hours with a thickness of the dielectric layer being on the order of 20 μm, sufficient lifetime characteristics have not been achieved yet for laminated ceramic capacitors subjected to intermediate to high voltage applications at this time. A dielectric ceramic is required which has a better highly-accelerated lifetime with excellent reliability even when a dielectric layer has a thickness of 10 μm or less.

The present invention has been made in view of these circumstances, and an object of the present invention is to provide a dielectric ceramic which can achieve favorable reliability, and a laminated ceramic capacitor using the dielectric ceramic, which is suitable for intermediate to high voltage applications, even when dielectric layers are reduced in thickness.

The present inventors have found, through earnest research on semiconductor ceramics containing a barium titanate based compound as their main constituent for the achievement of the object mentioned above, that the lifetime characteristics of the semiconductor ceramic can be improved by containing a specific rare earth oxide, a Mg oxide, a Mn oxide, and a silicon oxide in predetermined amounts, additionally separating crystal grains into larger grains of 0.7 μm or more in grain size and smaller grains of 0.6 μm or less in grain size to define the respective average grain sizes for the larger and smaller grains and the ratio between the average grain sizes, further defining the area ratios (the area of the dielectric occupied expressed as a fraction) in the semiconductor ceramic for the larger and smaller grains, and thus, a semiconductor ceramic can be achieved which has more favorable reliability even when dielectric layers are reduced in thickness. In addition, it has been also determined that a similar effect is also produced when some of the Ti is substituted with a predetermined amount of Zr.

The present invention has been made based on this finding, and a dielectric ceramic according to the present invention contains a composition represented by $\{100(BaTiO_3+aBaZrO_3)+bR+cMg+dMn+eSi\}$, where R represents one or more elements selected from the group of Sm, Eu, Gd, Tb, Dy, and Ho, wherein a, b, c, d, and e respectively satisfy $0 \leq a \leq 0.2$, $8.0 \leq b \leq 12.0$, $1.0 \leq c \leq 10.0$, $0.1 \leq d \leq 3.0$, and $1.0 \leq e \leq 10.0$, and includes first grains A of 0.7 μm or more in grain size and second grains B of 0.6 μm or less in grain size, wherein the average grain size (Aave) for the first grains A and a average grain size (Bave) for the second grains B respectively satisfy $0.8\ \mu m \leq Aave \leq 2.0\ \mu m$ and $0.1\ \mu m \leq Bave \leq 0.5\ \mu m$, the ratio Aave/Bave between the average grain size Aave and the average grain size Bave satisfies Aave/Bave$\geq$3.0, and the area ratio (SA) occupied by the first grains and a area ratio (SB) occupied by the second grains satisfy $0.3 \leq SA \leq 0.9$, $0.1 \leq SB \leq 0.7$, and $0.8 \leq SA+SB \leq 1.0$.

It is to be noted that the average grain size in the present invention refers to an equivalent circle grain diameter corresponding to a cumulative number distribution of 50%.

In addition, it is considered that a similar effect can also be produced when the Ba of the $BaTiO_3$ is substituted with Ca or Sr. More specifically, the dielectric ceramic according to the present invention may have some of the Ba substituted with at least one of Ca and Sr if it does not substantially detract from the effect.

In addition, the dielectric layers are characteristically formed from the dielectric ceramic described above in a laminated ceramic capacitor according to the present invention, which includes a ceramic sintered body with dielectric layers and internal electrodes alternately stacked.

The dielectric ceramic according to the present invention contains predetermined amounts of $BaZrO_3$, R, Mg, Mn, and Si with respect to the barium titanate based compound, has the respective average grain sizes Aave and Bave for the first grains A of 0.7 μm or more in grain size and for the second grains B of 0.6 μm or less in grain size in the predetermined ranges, with the ratio between the both average grain sizes in the predetermined relationship, and further has the area ratios SA and SB of the first and second grains satisfying the predetermined relationships, allowing the lifetime characteristics to be improved, and thereby achieving a semiconductor ceramic with further favorable reliability, even when the dielectric layers are reduced in thickness.

A similar effect can also be produced when some of the Ba is substituted with at least one of Ca and Sr.

In addition, the dielectric layers are formed from the dielectric ceramic described above in the laminated ceramic capacitor according to the present invention, which includes the ceramic sintered body with the dielectric layers and internal electrodes alternately stacked. Thus, even when the dielectric layers are further reduced in thickness, a laminated ceramic capacitor suitable for intermediate to high voltage applications can be achieved which has a favorable highly-accelerated life with excellent reliability.

BRIEF DESCRIPTION OF THE DRAWINGS

The sole FIGURE is a cross-sectional view schematically illustrating an embodiment of a laminated ceramic capacitor according to the present invention.

DETAILED DESCRIPTION OF THE INVENTION

Next, an embodiment of the present invention will be described in detail.

A dielectric ceramic as an embodiment of the present invention contains a composition represented by (A).

$$100(BaTiO_3+aBaZrO_3)+bR+cMg+dMn+eSi \quad (A)$$

More specifically, the dielectric ceramic contains $BaTiO_3$ as its main constituent, contains, as an accessory constituent, a parts by mol of $BaZrO_3$ with respect to 1 part by mol of the main constituent, and further contains, as other accessory constituents, b mol of R, c mol of Mg, d mol of Mn, and e mol of Si with respect to 100 parts by mol of the main constituent.

The main component of the crystal grains is mainly $BaTiO_3$, and it is favorable that $BaZrO_3$ also exists in the crystal grains. The accessory components R, Mg, Mn, and Si can be present in crystal grains or at crystal grain boundaries (including crystal triple points).

R represents one or more elements selected from the group of Sm, Eu, Gd, Tb, Dy, and Ho. Furthermore, the a, b, c, d, and e mentioned above fall within the ranges represented by the following formulas (1) to (5).

$$0 \leq a \leq 0.2 \quad (1)$$

$$8.0 \leq b \leq 12.0 \quad (2)$$

$$1.0 \leq c \leq 10.0 \quad (3)$$

$$0.1 \leq d \leq 3.0 \quad (4)$$

$$1.0 \leq e \leq 10.0 \quad (5)$$

In addition, the dielectric ceramic according to the present invention is formed so that the average grain size Aave for the larger first grains A of 0.7 μm or more in grain size satisfies the following formula (6), whereas the average grain size Bave for the smaller second grains B of 0.6 μm or less in grain size satisfies the following formula (7).

$$0.8 \text{ μm} \leq Aave \leq 2.0 \text{ μm} \quad (6)$$

$$0.1 \text{ μm} \leq Bave \leq 0.5 \text{ μm} \quad (7)$$

Furthermore, the ratio Aave/Bave between the average grain size Aave for the first grains A and the average grain size Bave for the second grains B satisfies the relationship represented by the following formula (8).

$$Aave/Bave \geq 3.0 \quad (8)$$

In the dielectric ceramic according to the present invention, the area ratio SA occupied by the first grains A and the area ratio SB occupied by the second grains B satisfy the relationships represented by the following formulas (9) to (11).

$$0.3 \leq SA \leq 0.9 \quad (9)$$

$$0.1 \leq SB \leq 0.7 \quad (10)$$

$$0.8 \leq SA+SB \leq 1.0 \quad (11)$$

The dielectric ceramic can, because (A) satisfies the formulas (1) to (5) with the synergistic effect between the first grains A and second grains B satisfying the formulas (6) to (11), suppress a decrease in insulation resistance and achieve favorable reliability, even when a high electric field is applied under a high temperature atmosphere for a long period of time with dielectric layers further reduced in thickness. Specifically, even when a high electric field of 400 V is applied at a temperature of 170° C., a lifetime of 100 hours or more can be achieved.

More specifically, when the crystal grains of the semiconductor ceramic according to the present invention are separated into the larger first grains A of 0.7 μm or more in grain size and the smaller second grains B of 0.6 μm or less in grain size, the average grain size Aave for the first grains A is within the range of 0.8 to 2.0 μm, whereas the average grain size Bave for the second grains B is within the range of 0.1 to 0.5 μm. If the average grain sizes Aave and Bave for the first grains A and the second grains B fall outside these ranges, it will be then impossible to ensure desirable reliability.

In addition, if the ratio between the average grain size Aave for the first grains A and the average grain size Bave for the second grains B Aave/Bave is less than 3.0, there is a possibility that the excessively small number of first grains A will lead to decreased reliability. Thus, the first grains A and the second grains B are compounded so that the ratio Aave/Bave is 3.0 or more as represented by the formula (8).

Furthermore, the area ratios SA and SB of the first grains A and second grains B in the dielectric ceramic are adapted to satisfy the formulas (9) to (11) for the following reasons.

When a large number of first grains A with the larger average grain size Aave is present in the crystal grains, the reliability in the crystal grains is improved, thus allowing sufficient reliability to be achieved even under high electric field intensity. To that end, the area of first grains A occupied in the dielectric layers (SA) needs to be 0.3 or more. However, an area SA greater than 0.9 provides the excessive amount of first grains A which are larger in grain size, thereby resulting in fewer crystal grain boundaries, and thus, there is a possibility that the reliability may be decreased when the dielectric layers are reduced in thickness.

On the other hand, an increase in the number of the second grains B with the smaller average grain size Bave increases the number of crystal grain boundaries, and allows sufficient reliability to be achieved even when the dielectric layers are reduced in thickness. To that end, the area (SB) of the second grains B in the dielectric layers needs to be 0.1 or more. However, an area ratio SB greater than 0.7 will cause a larger number of second grains B to be present in the crystal grains. Then, the second grains B cause a decrease in reliability in the crystal grains, and thus make it more likely that the reliability is decreased under high electric field intensity.

As described above, the coexistence of the grains A larger in grain size and the grains B smeller in grain size at an area presence ratio within a predetermined range allows both the reliability at the crystal grain boundaries and the reliability in the crystal grains to be improved.

In addition, when the total of the area ratio SA of the first grains A and the area ratio SB of the second grains B is less than 0.8, the presence of ratio both the first grains A and the second grains B is lowered to bring about the possibility of a failure to ensure sufficient reliability.

For these reasons, the dielectric ceramic according to the present invention is adapted so that the area ratio SA of the first grains A and the area ratio SB of the second grains B satisfy the formulas (9) to (11), thereby allowing favorable reliability to be maintained even under high electric field intensity.

In addition, (A) is adapted to satisfy the formulas (1) to (5) for the following reasons.

A substantial amount of rare earth oxide R contained in the dielectric ceramic allows the rare earth element R to be present both at crystal grain boundaries and in crystal grains, thereby allowing the lifetime characteristics during high temperature loading to be improved, and thus allowing for improved reliability.

However, when the R molar content b is less than 8.0 parts by mol with respect to 100 parts by mol of the main constituent, it is not possible to improve the reliability sufficiently. On the other hand, when R is excessively present such that the R molar content b is greater than 12.0 parts by mol, there is also a possibility that decreased reliability may be caused in turn.

In addition, when the $BaZrO_3$ molar content a with respect to 1 part by mol of $BaTiO_3$, that is, the molar substitution a of Zr with respect to Ti in $BaTiO_3$, is greater than 0.2, there is a possibility that, the insulation resistance will be decreased significantly during high temperature loading when the dielectric layers are reduced in thickness, thereby resulting in a failure to achieve a desirable favorable reliability.

Furthermore, when the Mg molar content c is greater than 10.0 parts by mol, or the Mn molar content d is greater than 3.0 parts by mol, or the Si molar content e is greater than 10.0 parts by mol, there is also a possibility that, when the dielectric layers are reduced in thickness, the insulation resistance will be decreased significantly during high temperature loading, thereby resulting in a failure to achieve a desirable favorable reliability.

On the other hand, when the Mg molar content c is less than 1.0 part by mol, or when the Mn molar content d is less than 0.1 parts by mol, there is a possibility that the dielectric ceramic will turn into a semiconductor. When the Si molar content e is less than 1.0 part by mol, there is a possibility that decreased sinterability will be caused.

For these reasons, (A) is adapted to satisfy the formulas (1) to (5) in the present embodiment.

In addition, the $BaTiO_3$ as the main constituent has a perovskite structure, in which some of Ti can be substituted with Zr, if necessary, in the present embodiment, and some of Ba is preferably substituted with Sr and/or Ca.

While the compounding molar ratio between the A site and the B site is supposed to be 1.000 stoichiometrically, the compound is also preferably provided so that the A site or the B site is excessive, if necessary, to such an extent that there is no effect on various characteristics, sinterability, etc.

Next, a laminated ceramic capacitor using the dielectric ceramic described above will be described in detail.

The sole FIGURE is a cross-sectional view schematically illustrating an embodiment of the laminated ceramic capacitor.

The laminated ceramic capacitor has internal electrodes $2a$ to $2f$ buried in a ceramic sintered body 1, has external electrodes $3a$ and $3b$ formed on both ends of the ceramic sintered body 1, and further has first plating films $4a$ and $4b$ and second plating films $5a$ and $5b$ formed on the surfaces of the external electrodes $3a$ and $3b$.

More specifically, the ceramic sintered body 1 is composed of dielectric layers $6a$ to $6g$ and internal electrode layers $2a$ to $2f$ stacked alternately and subjected to firing, and the internal electrode layers $2a$, $2c$, and $2e$ are electrically connected the external electrode $3a$, whereas the internal electrode layers $2b$, $2d$, and $2f$ are electrically connected the external electrode $3b$.

Furthermore, capacitance is formed between the opposed surfaces of the internal electrode layers $2a$, $2c$, and $2e$ and of the internal electrode layers $2b$, $2d$, and $2f$. The dielectric layers $6a$ to $6g$ are formed from the dielectric ceramic described above.

In addition, while the internal electrode material constituting the internal electrode layers $2a$ to $2f$ are not particularly limited, the material which is preferably used contains inexpensive and highly conductive Ni as its main constituent.

Thus, even when the dielectric ceramic layers are reduced in thickness, favorable high temperature load characteristics can be achieved.

Next, a method for producing the laminated ceramic capacitor described above will be briefly described.

First, two types of main constituent powders ($BaTiO_3$) are produced which are different in average grain size from each other.

For example, $BaCO_3$ and two types of $TiO_2$ which are different in specific surface area from each other are prepared as ceramic raw materials. Then, these ceramic raw materials are weighed in predetermined amounts, and the weighed materials are put along with grinding medium balls such as PSZ (Partially Stabilized Zirconia) balls and pure water into a ball mill, and subjected to sufficient wet mixing and grinding, thereby producing two types of main constituent powders which are different in average grain size from each other, that is, a first main constituent powder and a second main constituent powder.

Then, $BaZrO_3$, rare earth oxides ($Gd_2O_3$, $Sm_2O_3$, $Eu_2O_3$, $Tb_2O_3$, $Dy_2O_3$, and/or $Ho_2O_3$), a Mg compound, a Mn compound, and a Si compound are prepared as accessory constituent powders.

Next, the first and second main constituent powders, and the accessory constituent powders are weighed in predetermined amounts, and the weighed materials are put along with a grinding medium such as PSZ balls and pure water into a ball mill, and subjected to sufficient wet mixing and grinding, and to drying, thereby producing ceramic raw material powders.

Then, this ceramic raw material powder is put along with an organic binder and an organic solvent, as well as a grinding medium, into a ball mill for carrying out wet mixing, thereby producing a ceramic slurry, and the ceramic slurry is subjected to shape forming by a RIP method, a doctor blade method, or the like, to prepare ceramic green sheets which have a thickness of 10 μm or less after firing.

A conductive material such as a Ni powder is mixed with an organic vehicle and an organic solvent, and kneaded in a three-roll mill, thereby producing a conductive paste for internal electrodes.

The conductive paste for internal electrodes is screen printed onto the ceramic green sheets, thereby forming a conductive film in a predetermined pattern on the surfaces of the ceramic green sheets.

Then, the multiple ceramic green sheets with the conductive films formed thereon are stacked in a predetermined direction, sandwiched between ceramic green sheets with no conductive films formed thereon, subjected to pressure bonding, and cut into a predetermined size to prepare a ceramic laminate. The ceramic laminate is thereafter subjected to a treatment for the removal of the binder at a temperature of 300° C. to 500° C., and further subjected to a firing treatment at a temperature of 1100° C. to 1300° C. for about 2 hours in a reducing atmosphere composed of a $H_2$—$N_2$—$H_2O$ gas with an oxygen partial pressure controlled to $10^{-9}$ MPa to $10^{-12}$ MPa. This firing treatment provides co-sintered conductive films and ceramic green sheets, thereby resulting in the ceramic sintered body 1 with the dielectric layers 6a to 6s and internal electrodes 2a to 2f alternately stacked.

Next, a conductive paste for external electrodes is applied onto both end surfaces of the ceramic sintered body 1, and subjected to a firing treatment at a temperature of 600° C. to 800° C. to form the external electrodes 3a and 3b.

It is to be noted that while the conductive material contained in the conductive paste for external electrodes is not also particularly limited, it is preferable in terms of reduction in cost to use a material containing Ag or Cu, or an alloy thereof as its main constituent and containing glass frit such as $B_2O_3$—$Li_2O$—Si—BaO.

As a method for forming the external electrodes 3a and 3b, the conductive paste for external electrodes may be applied onto the both end surfaces of the ceramic laminate, and then subjected to a firing treatment at the same time as the ceramic laminate.

Finally, electrolytic plating is applied to form first plating films 4a and 4b composed of Ni, Cu, a Ni—Cu alloy, or the like, on the surfaces of the external electrodes 3a and 3b, and further form second plating films 5a and 5b composed of solder, tin, or the like, on the surfaces of the first plating films 4a and 4b, thus allowing for the production of a laminated ceramic capacitor.

The thus formed laminated ceramic capacitor has the dielectric layers 6a to 6g formed from the above-described dielectric ceramic according to the present invention. Thus, when the dielectric layers 6a to 6g are reduced in thickness to 10 μm or less, a laminated ceramic capacitor for intermediate to high voltage applications can be achieved which provides favorable lifetime characteristics during high temperature loading with excellent reliability.

It is to be noted that the present invention is not limited to the embodiment described above, and it comes near to stating the obvious that various changes can be made without departing from the gist of the present invention. For example, while the two types of main constituent powders which are different in average grain size from each other are used as starting raw materials in the present embodiment, the manufacturing method is not particularly limited as long as (A) as a final product satisfies the formulas (1) to (5) whereas the larger first grains A of 0.7 μm or more in grain size and the smaller second grains B of 0.6 μm or less in grain size satisfy the formulas (6) to (11). For example, two types of $BaTiO_3$ which are different in compounding molar ratio between Ba and Ti from each other may be used as starting raw materials.

In addition, the dielectric ceramic according to the present invention is allowed to contain impurities, etc. to such an extent that the characteristics are not affected.

Next, examples of the present invention will be described specifically.

Example 1

Preparation of Samples

First, two types of main constituent powders were produced which were different in average grain size from each other.

More specifically, $BaCO_3$ and $TiO_2$ with a specific surface area of 30 m$^2$/g were prepared as ceramic raw materials. Then, these ceramic raw materials were weighed in predetermined amounts, put along with PSZ balls and pure water into a ball mill, and subjected to sufficient wet mixing and grinding, thereby producing a first main constituent powder composed of $Ba_{1.005}TiO_3$ with an average grain size of 0.6 to 2.0 μm.

Then, $BaCO_3$ and $TiO_2$ with a specific surface area of 50 m$^2$/g were prepared as ceramic raw materials. These ceramic raw materials were weighed in predetermined amounts, put along with PSZ balls and pure water into a ball mill, and subjected to sufficient wet mixing and grinding, thereby producing a second main constituent powder composed of $Ba_{1.005}TiO_3$ with an average grain size of 0.05 to 0.5 μm.

Next, $BaZrO_3$, $Gd_2O_3$, $Sm_2O_3$, $Eu_2O_3$, $Tb_2O_3$, $Dy_2O_3$ $Ho_2O_3$ $MgCO_3$, $MnCO_3$, and Si were prepared as accessory constituent powders.

Then, the first and second main constituent powders were weighed so that the compounding molar ratios α and β of the first and second main constituent powders were provided as shown in Table 1, the $BaZrO_3$ was further weighed so that the molar content a of the $BaZrO_3$ was provided as shown in Table 1 with respect to 1 part by mol of the main constituent, and the other accessory constituent powders were weighed so that the molar contents b to e of the accessory constituent powders were provided as shown in Table 1 with respect to 100 parts by mol of the main constituent.

These weighed materials were put along with PSZ balls and pure water into a ball mill, and subjected to sufficient wet mixing and grinding, and then to evaporation drying, thereby producing ceramic raw material powders.

Next, the ceramic raw material powder was put along with ethanol and a polyvinyl butyral based binder, as well as PSZ balls, into a ball mill for carrying out wet mixing for 12 hours, thereby producing a ceramic slurry, and the ceramic slurry was further subjected to shape forming by a RIP method, thereby preparing ceramic green sheets so as to provide a thickness of 10 μm after firing.

A conductive paste for internal electrodes was prepared containing a Ni powder, an organic vehicle, and an organic solvent.

Next, the conductive paste for internal electrodes was applied by screen printing onto the ceramic green sheets, thereby forming a conductive film in a predetermined pattern on the surfaces of the ceramic green sheets.

Then, a predetermined number of ceramic green sheets with the conductive films formed thereon were stacked, sandwiched between ceramic green sheets with no conductive films formed thereon, subjected to pressure bonding, and cut into a predetermined size to prepare a ceramic laminate. The ceramic laminate was thereafter subjected to a treatment for the removal of the binder at a temperature of 300° C. in a nitrogen atmosphere, and further subjected to a firing treatment at a temperature of 1200° C. for about 2 hours in a reducing atmosphere composed of a $H_2$—$N_2$—$H_2O$ gas with an oxygen partial pressure controlled to $10^{-10}$ MPa, thereby resulting in co-sintered conductive films and ceramic green sheets, and thus preparing a ceramic sintered body with internal electrodes buried therein.

A conductive paste for external electrodes was prepared containing a Cu powder and $B_2O_3$—$Li_2O$—Si—BaO based glass frit. Then, the conductive paste for external electrodes was applied onto both end surfaces of the ceramic sintered body, and subjected to a firing treatment at a temperature of 800° C. in a nitrogen atmosphere to form external electrodes, thereby preparing samples of sample numbers 1 to 39.

The obtained samples had dielectric layers with a thickness of 10 μm, and external dimensions of length: 2.0 mm, width: 1.2 mm, and thickness: 1.0 mm; the area of the electrode opposed per dielectric layer was 1.4 mm²; and the effective number of dielectric ceramic layers was 10.

Evaluations of Samples

For the respective samples of sample numbers 1 to 39, the ceramic structure was analyzed in accordance with the following method to obtain the average grain size Aave for the first grains A and the average grain size Bave for the second grains B, the ratio Aave/Bave between the both average grain sizes, the area ratio SA for the first grains A in the dielectric layers, the area ratio SB for the second grains B in the dielectric layers, and the sum (SA+SB) of the both area ratios.

More specifically, each sample was subjected to fracturing, and to etching to remove the glass component in crystal grain boundaries such that the crystal grain boundary section was made clear, and a secondary electron image of the sample was observed by a FE-SEM. Then, 5 visual fields with on the order of around 50 visually recognizable crystal grains were confirmed with each field as a sample, and the grain size distribution of these crystal grains was analyzed to obtain, for each sample number, the average grain size Aave and Dave, respectively, for the first grains A of 0.7 μm or more in grain size and the second grains B of 0.6 μm or less in grain size.

Then, the area ratios were obtained for the first and second grains A and B in the visual fields, which are referred to as area ratios SA and SB, respectively, for the first and second grains A and B in the dielectric layers.

Then, highly-accelerated life testing was carried out to calculate the mean time to failure, and thereby evaluate the lifetime characteristics.

More specifically, a direct-current voltage of 400 V was applied at a temperature of 170° C. to 10 samples for each of sample numbers 1 to 39, and the period of time until the insulation resistance value was decreased to 100 kΩ or less was measured to calculate an average value as the mean time to failure, and thereby evaluate the lifetime characteristics.

Table 1 shows the compositional constituents for the respective samples of sample numbers 1 to 39, and Table 2 shows the result of the ceramic structure analysis and the mean time to failure. An * indicates a sample outside the scope of the present invention.

TABLE 1

| | | | | | | | | | | |
|---|---|---|---|---|---|---|---|---|---|---|
| | \multicolumn{10}{c}{$100\{(\alpha Ba_{1.005}TiO_3 + \beta Ba_{1.005}TiO_3) + aBaZrO_3\} + bR + cMg + dMn + eSi$} |
| | $\alpha BaTiO_3$ | | $\beta BaTiO_3$ | | | | | | | |
| Sample No. | Average Grain Size (μm) | α | Average Grain Size (μm) | β | Ba/(Ti + Zr) Molar Ratio | A | R | b | c | d | e |
| 1* | 0.8 | 0.20 | 0.2 | 0.80 | 1.010 | 0.10 | Gd | 10.0 | 5.0 | 1.0 | 6.0 |
| 2 | 0.8 | 0.30 | 0.2 | 0.70 | 1.010 | 0.10 | Gd | 10.0 | 5.0 | 1.0 | 6.0 |
| 3 | 0.8 | 0.50 | 0.2 | 0.50 | 1.010 | 0.10 | Gd | 10.0 | 5.0 | 1.0 | 6.0 |
| 4 | 0.8 | 0.90 | 0.2 | 0.10 | 1.010 | 0.10 | Gd | 10.0 | 5.0 | 1.0 | 6.0 |
| 5* | 0.8 | 1.00 | 0.2 | 0.00 | 1.010 | 0.10 | Gd | 10.0 | 5.0 | 1.0 | 6.0 |
| 6 | 0.8 | 0.50 | 0.2 | 0.50 | 1.010 | 0.10 | Sm | 10.0 | 5.0 | 1.0 | 6.0 |
| 7 | 0.8 | 0.50 | 0.2 | 0.50 | 1.010 | 0.10 | Eu | 10.0 | 5.0 | 1.0 | 6.0 |
| 8 | 0.8 | 0.50 | 0.2 | 0.50 | 1.010 | 0.10 | Tb | 10.0 | 5.0 | 1.0 | 6.0 |
| 9 | 0.8 | 0.50 | 0.2 | 0.50 | 1.010 | 0.10 | Dy | 10.0 | 5.0 | 1.0 | 6.0 |
| 10 | 0.8 | 0.50 | 0.2 | 0.50 | 1.010 | 0.10 | Ho | 10.0 | 5.0 | 1.0 | 6.0 |
| 11 | 0.6 | 0.50 | 0.1 | 0.50 | 1.010 | 0.10 | Gd | 10.0 | 5.0 | 1.0 | 6.0 |
| 12 | 1.8 | 0.50 | 0.3 | 0.50 | 1.010 | 0.10 | Gd | 10.0 | 5.0 | 1.0 | 6.0 |
| 13* | 2.0 | 0.50 | 0.4 | 0.50 | 1.010 | 0.10 | Gd | 10.0 | 5.0 | 1.0 | 6.0 |
| 14* | 0.8 | 0.50 | 0.05 | 0.50 | 1.010 | 0.10 | Gd | 10.0 | 5.0 | 1.0 | 6.0 |
| 15 | 0.6 | 0.50 | 0.08 | 0.50 | 1.010 | 0.10 | Gd | 10.0 | 5.0 | 1.0 | 6.0 |
| 16 | 1.3 | 0.50 | 0.4 | 0.50 | 1.010 | 0.10 | Gd | 10.0 | 5.0 | 1.0 | 6.0 |
| 17* | 0.8 | 0.50 | 0.4 | 0.50 | 1.010 | 0.10 | Gd | 10.0 | 5.0 | 1.0 | 6.0 |
| 18 | 0.8 | 0.50 | 0.2 | 0.50 | 1.003 | 0.10 | Gd | 10.0 | 5.0 | 1.0 | 6.0 |
| 19 | 0.8 | 0.50 | 0.2 | 0.50 | 1.020 | 0.10 | Gd | 10.0 | 5.0 | 1.0 | 6.0 |
| 20 | 0.8 | 0.50 | 0.2 | 0.50 | 1.010 | 0.00 | Gd | 10.0 | 5.0 | 1.0 | 6.0 |
| 21 | 0.8 | 0.50 | 0.2 | 0.50 | 1.010 | 0.05 | Gd | 10.0 | 5.0 | 1.0 | 6.0 |
| 22 | 0.8 | 0.50 | 0.2 | 0.50 | 1.010 | 0.20 | Gd | 10.0 | 5.0 | 1.0 | 6.0 |
| 23* | 0.8 | 0.50 | 0.2 | 0.50 | 1.010 | 0.25 | Gd | 10.0 | 5.0 | 1.0 | 6.0 |
| 24* | 0.8 | 0.50 | 0.2 | 0.50 | 1.010 | 0.10 | Gd | 7.0 | 5.0 | 1.0 | 6.0 |
| 25 | 0.8 | 0.50 | 0.2 | 0.50 | 1.010 | 0.10 | Gd | 8.0 | 5.0 | 1.0 | 6.0 |
| 26 | 0.8 | 0.50 | 0.2 | 0.50 | 1.010 | 0.10 | Gd | 12.0 | 5.0 | 1.0 | 6.0 |
| 27* | 0.8 | 0.50 | 0.2 | 0.50 | 1.010 | 0.10 | Gd | 13.0 | 5.0 | 1.0 | 6.0 |
| 28* | 0.8 | 0.50 | 0.2 | 0.50 | 1.010 | 0.10 | Gd | 10.0 | 0.5 | 1.0 | 6.0 |
| 29 | 0.8 | 0.50 | 0.2 | 0.50 | 1.010 | 0.10 | Gd | 10.0 | 1.0 | 1.0 | 6.0 |
| 30 | 0.8 | 0.50 | 0.2 | 0.50 | 1.010 | 0.10 | Gd | 10.0 | 10.0 | 1.0 | 6.0 |
| 31* | 0.8 | 0.50 | 0.2 | 0.50 | 1.010 | 0.10 | Gd | 10.0 | 12.0 | 1.0 | 6.0 |
| 32* | 0.8 | 0.50 | 0.2 | 0.50 | 1.010 | 0.10 | Gd | 10.0 | 5.0 | 0.05 | 6.0 |
| 33 | 0.8 | 0.50 | 0.2 | 0.50 | 1.010 | 0.10 | Gd | 10.0 | 5.0 | 0.1 | 6.0 |

TABLE 1-continued

| | 100 {(αBa₁.₀₀₅TiO₃ + βBa₁.₀₀₅TiO₃) + aBaZrO₃} + bR + cMg + dMn + eSi | | | | | | | | | | |
|---|---|---|---|---|---|---|---|---|---|---|---|
| | αBaTiO₃ | | βBaTiO₃ | | | | | | | | |
| Sample No. | Average Grain Size (μm) | α | Average Grain Size (μm) | β | Ba/(Ti + Zr) Molar Ratio | A | R | b | c | d | e |
| 34 | 0.8 | 0.50 | 0.2 | 0.50 | 1.010 | 0.10 | Gd | 10.0 | 5.0 | 3.0 | 6.0 |
| 35* | 0.8 | 0.50 | 0.2 | 0.50 | 1.010 | 0.10 | Gd | 10.0 | 5.0 | 5.0 | 6.0 |
| 36* | 0.8 | 0.50 | 0.2 | 0.50 | 1.010 | 0.10 | Gd | 10.0 | 5.0 | 1.0 | 0.5 |
| 37 | 0.8 | 0.50 | 0.2 | 0.50 | 1.010 | 0.10 | Gd | 10.0 | 5.0 | 1.0 | 1.0 |
| 38 | 0.8 | 0.50 | 0.2 | 0.50 | 1.010 | 0.10 | Gd | 10.0 | 5.0 | 1.0 | 10.0 |
| 39* | 0.8 | 0.50 | 0.2 | 0.50 | 1.010 | 0.10 | Gd | 10.0 | 5.0 | 1.0 | 15.0 |

TABLE 2

| Sample No. | Aave (μm) | Bave (μm) | Aave/Bave | SA | SB | SA + SB | Mean Time to Failure (hr) |
|---|---|---|---|---|---|---|---|
| 1* | 1.0 | 0.3 | 3.3 | 0.2 | 0.6 | 0.8 | 80 |
| 2 | 1.0 | 0.3 | 3.3 | 0.3 | 0.6 | 0.9 | 150 |
| 3 | 1.0 | 0.3 | 3.3 | 0.5 | 0.4 | 0.9 | 200 |
| 4 | 1.0 | 0.3 | 3.3 | 0.9 | 0.1 | 1.0 | 160 |
| 5* | 1.0 | 0.3 | 3.3 | 0.95 | 0.05 | 1.0 | 90 |
| 6 | 1.2 | 0.4 | 3.0 | 0.5 | 0.4 | 0.9 | 180 |
| 7 | 1.1 | 0.3 | 3.7 | 0.5 | 0.4 | 0.9 | 200 |
| 8 | 1.0 | 0.3 | 3.3 | 0.5 | 0.4 | 0.9 | 190 |
| 9 | 1.0 | 0.2 | 5.0 | 0.5 | 0.4 | 0.9 | 210 |
| 10 | 0.9 | 0.2 | 4.5 | 0.5 | 0.4 | 0.9 | 200 |
| 11 | 0.8 | 0.2 | 4.0 | 0.5 | 0.4 | 0.9 | 140 |
| 12 | 2.0 | 0.4 | 5.0 | 0.5 | 0.4 | 0.9 | 180 |
| 13* | 2.2 | 0.5 | 4.4 | 0.5 | 0.4 | 0.9 | 70 |
| 14* | 1.0 | 0.08 | 12.5 | 0.5 | 0.4 | 0.9 | 80 |
| 15 | 0.8 | 0.1 | 8.0 | 0.5 | 0.4 | 0.9 | 150 |
| 16 | 1.5 | 0.5 | 3.0 | 0.5 | 0.4 | 0.9 | 200 |
| 17* | 1.0 | 0.4 | 2.0 | 0.5 | 0.4 | 0.9 | 60 |
| 18 | 1.2 | 0.4 | 3.0 | 0.5 | 0.4 | 0.9 | 120 |
| 19 | 0.9 | 0.3 | 4.5 | 0.5 | 0.5 | 1.0 | 160 |
| 20 | 1.0 | 0.3 | 3.3 | 0.5 | 0.4 | 0.9 | 150 |
| 21 | 1.0 | 0.3 | 3.3 | 0.5 | 0.4 | 0.9 | 250 |
| 22 | 1.0 | 0.3 | 3.3 | 0.5 | 0.4 | 0.9 | 160 |
| 23* | 1.0 | 0.3 | 3.3 | 0.5 | 0.4 | 0.9 | 90 |
| 24* | 1.5 | 0.5 | 3.0 | 0.5 | 0.4 | 0.9 | 70 |
| 25 | 1.4 | 0.4 | 3.5 | 0.5 | 0.4 | 0.9 | 120 |
| 26 | 1.0 | 0.2 | 5.0 | 0.5 | 0.4 | 0.9 | 130 |
| 27* | 0.9 | 0.2 | 4.5 | 0.5 | 0.4 | 0.9 | 60 |
| 28* | 1.0 | 0.3 | 3.3 | 0.5 | 0.4 | 0.9 | Into semi-conductor |
| 29 | 1.0 | 0.3 | 3.3 | 0.5 | 0.4 | 0.9 | 150 |
| 30 | 1.0 | 0.3 | 3.3 | 0.5 | 0.4 | 0.9 | 160 |
| 31* | 1.0 | 0.3 | 3.3 | 0.5 | 0.4 | 0.9 | 90 |
| 32* | 1.0 | 0.3 | 3.3 | 0.5 | 0.4 | 0.9 | Into semi-conductor |
| 33 | 1.0 | 0.3 | 3.3 | 0.5 | 0.4 | 0.9 | 130 |
| 34 | 1.0 | 0.3 | 3.3 | 0.5 | 0.4 | 0.9 | 160 |
| 35* | 1.0 | 0.3 | 3.3 | 0.5 | 0.4 | 0.9 | 60 |
| 36* | 1.0 | 0.3 | 3.3 | 0.5 | 0.4 | 0.9 | Not sintered |
| 37 | 1.0 | 0.3 | 3.3 | 0.5 | 0.4 | 0.9 | 150 |
| 38 | 1.0 | 0.3 | 3.3 | 0.5 | 0.4 | 0.9 | 140 |
| 39* | 1.0 | 0.3 | 3.3 | 0.5 | 0.4 | 0.9 | 70 |

Sample number 1 exhibited a low area ratio SA of 0.2 for the first grains A occupied in the dielectric layers, and exhibited the short mean time to failure of 80 hours.

Sample number 5 exhibited a high area ratio SA of 0.95 for the first grains A occupied in the dielectric layers and a low area ratio SB of 0.05 for the second grains B occupied in the dielectric layers, and exhibited the short mean time to failure of 90 hours, which is less than 100 hours.

Sample number 13 exhibited a large average grain size Aave of 2.2 μm for the first grains A, and exhibited the short mean time to failure of 70 hours, which is less than 100 hours.

Sample number 14 exhibited a small average grain size Dave of 0.08 μm for the second grains B, and exhibited the short mean time to failure of 80 hours, which is less than 100 hours.

Sample number 17 exhibited a low grain size ratio Aave/Bave of 2.0 between the first grains A and the second grains B, and exhibited the short mean time to failure of 60 hours, which is less than 100 hours.

Sample number 23 exhibited a short mean time to failure of 90 hours, which is less than 100 hours, because of the high $BaZrO_3$ molar content a of 0.25 parts by mol with respect to 1 part by mol of the main constituent.

Sample number 24 exhibited a short mean time to failure of 70 hours, which is less than 100 hours, because of the low Gd molar content b of 7.0 parts by mol with respect to 100 parts by mol of the main constituent.

Sample number 27 exhibited a short mean time to failure of 60 hours, which is less than 100 hours, because of the high Gd molar content b of 13.0 parts by mol with respect to 100 parts by mol of the main constituent.

Sample number 28 turned into a semiconductor and failed to provide a desirable dielectric ceramic, because of the low Mg molar content c of 0.5 parts by mol with respect to 100 parts by mol of the main constituent.

Sample number 31 exhibited a short mean time to failure of 90 hours, which is less than 100 hours, because of the excessive Mg molar content c of 12.0 parts by mol with respect to 100 parts by mol of the main constituent.

Sample number 32 turned into a semiconductor and failed to provide a desirable dielectric ceramic, because of the low Mn molar content d of 0.05 parts by mol with respect to 100 parts by mol of the main constituent.

Sample number 35 exhibited a short mean time to failure of 60 hours, which is less than 100 hours, because of the excessive Mn molar content d of 5.0 parts by mol with respect to 100 parts by mol of the main constituent.

Sample number 36 failed to sinter at 1200° C., because of the low Si molar content e of 0.5 parts by mol with respect to 100 parts by mol of the main constituent.

Sample number 39 exhibited a short mean time to failure of 70 hours, which is less than 100 hours, because of the excessive Si molar content e of 15.0 parts by mol with respect to 100 parts by mol of the main constituent.

In contrast, sample numbers 2 to 4, 6 to 12, 15, 16, 18 to 22, 25, 26, 29, 30, 33, 34, 37, and 38 each fall within the range of the present invention: $0 \leq a \leq 0.2$, $8.0 \leq b \leq 12.0$, $1.0 \leq c \leq 10.0$, $0.1 \leq d \leq 3.0$, and $1.0 \leq e \leq 10.0$; as well as $0.8\ \mu m \leq Aave \leq 2.0$ μm, 0.1 μm≦Bave≦0.5 μm, Aave/Bave≧3.0, 0.3≦SA≦0.9, 0.1≦SB≦0.7, and 0.8≦SA+SB≦1.0, and exhibited a mean time to failure of 120 to 250 hours, and it has been thus confirmed that a laminated ceramic capacitor is achieved which have favorable lifetime characteristics with excellent reliability, even when a high electric field is applied at high temperature for a long period of time.

Example 2

Preparation of Samples

First, two types of main constituent powders were produced which were different in compounding molar ratio between Ba and Ti from each other.

More specifically, $BaCO_3$ and $TiO_2$ with a specific surface area of 30 $m^2/g$ were prepared as ceramic raw materials. Then, these ceramic raw materials were weighed in predetermined amounts, and the weighed materials were put along with PSZ balls and pure water into a ball mill, and subjected to sufficient wet mixing and grinding, thereby producing a first main constituent powder composed of $Ba_{m1}TiO_3$ and a second main constituent powder composed of $Ba_{m2}TiO_3$, which were different in compounding molar ratio between Ba and Ti from each other. It is to be noted that both the first and second main constituent powders had an average grain size of 0.2 μm.

Then, samples of sample numbers 51 to 70 were thereafter produced in accordance with the same method and procedure as in Example 1.

The obtained samples had the dielectric layers with a thickness of 10 μm, and external dimensions of length: 2.0 mm, width: 1.2 mm, and thickness: 1.0 mm, an area of the electrode opposed per dielectric layer of 1.4 $mm^2$, and an effective number of dielectric ceramic layers of 10.

Evaluations of Samples

For the respective samples of sample numbers 51 to 70, the ceramic structure was analyzed in accordance with the same method and procedure as in Example 1 to obtain the average grain size Aave for the first grains A and the average grain size Bave for the second grains B, the ratio Aave/Bave between the both average grain sizes, the area ratio SA for the first grains A in the dielectric layers, the area ratio SB for the second grains B in the dielectric layers, and the sum (SA+SB) of both area ratios.

In addition, for the respective samples of sample numbers 51 to 70, in accordance with the same method and procedure as in Example 1, a highly-accelerated life testing was carried out to calculate the mean time to failure, and thereby evaluate the lifetime characteristics.

Table 3 shows the compositional constituents for the respective samples of sample numbers 51 to 70, and Table 4 shows the result of the ceramic structure analysis and the mean time to failure.

TABLE 3

| | 100 {($\alpha Ba_{m1}TiO_3$ + $\beta Ba_{m2}TiO_3$) + 0.10$BaZrO_3$} + b$R$ + 5.0Mg + 1.0Mn + 6.0Si | | | | | | |
|---|---|---|---|---|---|---|---|
| Sample | $Ba_{m1}TiO_3$ | | $Ba_{m2}TiO_3$ | | Ba/(Ti + Zr) Molar Ratio | | |
| No. | M1 | α | m2 | β | (—) | R | b |
| 51* | 0.990 | 0.20 | 1.010 | 0.80 | 1.010 | Gd | 10.0 |
| 52 | 0.990 | 0.30 | 1.010 | 0.70 | 1.010 | Gd | 10.0 |
| 53 | 0.990 | 0.50 | 1.010 | 0.50 | 1.010 | Gd | 10.0 |

TABLE 3-continued

| | 100 {($\alpha Ba_{m1}TiO_3$ + $\beta Ba_{m2}TiO_3$) + 0.10$BaZrO_3$} + b$R$ + 5.0Mg + 1.0Mn + 6.0Si | | | | | | |
|---|---|---|---|---|---|---|---|
| Sample | $Ba_{m1}TiO_3$ | | $Ba_{m2}TiO_3$ | | Ba/(Ti + Zr) Molar Ratio | | |
| No. | M1 | α | m2 | β | (—) | R | b |
| 54 | 0.990 | 0.90 | 1.010 | 0.10 | 1.010 | Gd | 10.0 |
| 55* | 0.990 | 1.00 | 1.010 | 0.00 | 1.010 | Gd | 10.0 |
| 56* | 0.990 | 0.50 | 1.010 | 0.50 | 1.010 | Gd | 7.0 |
| 57 | 0.990 | 0.50 | 1.010 | 0.50 | 1.010 | Gd | 8.0 |
| 58 | 0.990 | 0.50 | 1.010 | 0.50 | 1.010 | Gd | 12.0 |
| 59* | 0.990 | 0.50 | 1.010 | 0.50 | 1.010 | Gd | 13.0 |
| 60 | 0.990 | 0.50 | 1.010 | 0.50 | 1.010 | Sm | 10.0 |
| 61 | 0.990 | 0.50 | 1.010 | 0.50 | 1.010 | Eu | 10.0 |
| 62 | 0.990 | 0.50 | 1.010 | 0.50 | 1.010 | Tb | 10.0 |
| 63 | 0.990 | 0.50 | 1.010 | 0.50 | 1.010 | Dy | 10.0 |
| 64 | 0.990 | 0.50 | 1.010 | 0.50 | 1.010 | Ho | 10.0 |
| 65 | 0.995 | 0.50 | 1.010 | 0.50 | 1.010 | Gd | 10.0 |
| 66 | 0.985 | 0.50 | 1.010 | 0.50 | 1.010 | Gd | 10.0 |
| 67* | 0.980 | 0.50 | 1.010 | 0.50 | 1.010 | Gd | 10.0 |
| 68* | 0.990 | 0.50 | 1.020 | 0.50 | 1.010 | Gd | 10.0 |
| 69 | 0.990 | 0.50 | 1.015 | 0.50 | 1.010 | Gd | 10.0 |
| 70* | 0.99 | 0.50 | 1.005 | 0.50 | 1.010 | Gd | 10.0 |

TABLE 4

| Sample No. | Aave (μm) | Bave (μm) | Aave/Bave | SA | SB | SA + SB | Mean Time to Failure (hr) |
|---|---|---|---|---|---|---|---|
| 51* | 1.0 | 0.3 | 3.3 | 0.2 | 0.7 | 0.9 | 70 |
| 52 | 1.2 | 0.3 | 4.0 | 0.3 | 0.6 | 0.9 | 160 |
| 53 | 1.2 | 0.3 | 4.0 | 0.5 | 0.4 | 0.9 | 210 |
| 54 | 1.3 | 0.3 | 4.3 | 0.9 | 0.1 | 1.0 | 170 |
| 55* | 1.3 | 0.3 | 4.3 | 0.95 | 0.05 | 1.0 | 90 |
| 56* | 1.7 | 0.5 | 3.4 | 0.5 | 0.4 | 0.9 | 60 |
| 57 | 1.5 | 0.4 | 3.8 | 0.5 | 0.4 | 0.9 | 120 |
| 58 | 1.1 | 0.3 | 3.7 | 0.5 | 0.4 | 0.9 | 140 |
| 59* | 1.0 | 0.3 | 3.3 | 0.5 | 0.4 | 0.9 | 70 |
| 60 | 1.5 | 0.5 | 3.0 | 0.5 | 0.4 | 0.9 | 200 |
| 61 | 1.2 | 0.4 | 3.0 | 0.5 | 0.4 | 0.9 | 210 |
| 62 | 1.2 | 0.3 | 4.0 | 0.5 | 0.4 | 0.9 | 180 |
| 63 | 1.1 | 0.3 | 3.7 | 0.5 | 0.4 | 0.9 | 190 |
| 64 | 1.0 | 0.2 | 5.0 | 0.5 | 0.4 | 0.9 | 180 |
| 65 | 0.8 | 0.2 | 4.0 | 0.5 | 0.4 | 0.9 | 140 |
| 66 | 2.0 | 0.4 | 5.0 | 0.5 | 0.4 | 0.9 | 180 |
| 67* | 2.2 | 0.5 | 4.4 | 0.5 | 0.4 | 0.9 | 70 |
| 68* | 1.2 | 0.08 | 15.0 | 0.5 | 0.4 | 0.9 | 80 |
| 69 | 1.2 | 0.1 | 12.0 | 0.5 | 0.4 | 0.9 | 150 |
| 70* | 1.2 | 0.5 | 2.4 | 0.5 | 0.4 | 0.9 | 60 |

*outside the scope of the present invention

Sample number 51 exhibited a low area ratio SA of 0.2 for the first grains A occupied in the dielectric layers, and thus exhibited the short mean time to failure of 70 hours.

Sample number 55 exhibited a high area ratio SA of 0.95 for the first grains A occupied in the dielectric layers and a low area ratio SB of 0.05 for the second grains B occupied in the dielectric layers, and exhibited a short mean time to failure of 90 hours, which is less than 100 hours.

Sample number 56 exhibited a short mean time to failure of 60 hours, which is less than 100 hours, because of the low $GdO_{3/2}$ molar content b of 7.0 parts by mol with respect to 100 parts by mol of the main constituent.

Sample number 59 exhibited a short mean time to failure of 70 hours, which is less than 100 hours, because of the high $GdO_{3/2}$ molar content b of 13.0 parts by mol with respect to 100 parts by mol of the main constituent.

Sample number 67 exhibited a large average grain size Aave of 2.2 μm for the first grains A, and exhibited a short mean time to failure of 70 hours, which is less than 100 hours.

Sample number 68 exhibited a small average grain size Save of 0.08 µm for the second grains B, and exhibited a short mean time to failure of 80 hours, which is less than 100 hours.

Sample number 70 exhibited a low grain size ratio Aave/Bave of 2.4 between the first grains A and the second grains B, and exhibited the short mean time to failure of 60 hours, which is less than 100 hours.

In contrast, sample numbers 52 to 54, 57, 58, 60 to 66, and 69 each fall within the range of the present invention: $0 \leq a \leq 0.2$, $8.0 \leq b \leq 12.0$, $1.0 \leq c \leq 10.0$, $0.1 \leq d \leq 3.0$, and $1.0 \leq e$ 10.0; as well as 0.8 µm$\leq$Aave$\leq$2.0 µm, 0.1 µm$\leq$Bave$\leq$0.5 µm, Aave/Bave$\geq$3.0, $0.3 \leq SA \leq 0.9$, $0.1 \leq SB \leq 0.7$, and $0.8 \leq SA+SB \leq 1.0$, exhibited a mean time to failure of 120 to 210 hours, and it has been thus confirmed that a laminated ceramic capacitor is achieved which have favorable lifetime characteristics with excellent reliability, even when a high electric field is applied at high temperature for a long period of time.

In addition, as is clear from Examples 1 and 2, it has been found that as long as the final product falls within the ranges mentioned above regardless of the manufacturing method, a laminated ceramic capacitor is achieved which have favorable lifetime characteristics with excellent reliability, even when a high electric field is applied at high temperature for a long period of time.

Even when the dielectric layers are reduced in thickness, a laminated ceramic capacitor suitable for intermediate to high voltage applications can be achieved which exhibits a favorable highly-accelerated lifetime result, and allows for improved reliability.

What is claimed is:

1. A dielectric ceramic comprising a composition represented by $$100(BaTiO_3 + aBaZrO_3) + bR + cMg + dMn + eSi$$

in which
R represents one or more elements selected from the group consisting of Sm, Eu, Gd, Tb, Dy, and Ho, $0 \leq a \leq 0.2$, $8.0 \leq b \leq 12.0$, $1.0 \leq c \leq 10.0$, $0.1 \leq d \leq 3.0$, $1.0 \leq e \leq 10.0$, having first grains A of 0.7 µm or more in grain size, the first grains A having an average grain size Aave, and second grains B of 0.6 µm or less in grain size, the second grains B having an average grain size Bave for, wherein 0.8 µm$\leq A$ave$\leq$2.0 µm, 0.1 µm$\leq B$ave$\leq$0.5 µm, and

$A$ave/$B$ave$\geq$3.0, and wherein an area ratio SA occupied by the first grains and an area ratio SB occupied by the second grains satisfy $0.3 \leq SA \leq 0.9$, $0.1 \leq SB \leq 0.7$, and $0.8 \leq SA+SB \leq 1.0$.

2. The dielectric ceramic according to claim 1, wherein 0.9 µm$\leq$Aave$\leq$1.7 µm 0.2 µm$\leq$Bave$\leq$0.5 µm, Aave/Bave$\geq$3.3, $0.5 \leq SA$, $0.4 \leq SB \leq 0.6$, and $0.9 \leq SA+SB \leq 1.0$.

3. The dielectric ceramic according to claim 2, wherein R is Gd.

4. The dielectric ceramic according to claim 1, wherein R is Gd.

5. A laminated ceramic capacitor comprising a ceramic sintered body comprising dielectric layers and internal electrodes,
wherein the dielectric layers are the dielectric ceramic according to claim 4.

6. The laminated ceramic capacitor according to claim 5, wherein the internal electrodes comprise Ni.

7. The laminated ceramic capacitor according to claim 6 having on its surface a pair of external electrodes comprising Ag, Cu or an alloy thereof.

8. A laminated ceramic capacitor comprising a ceramic sintered body comprising dielectric layers and internal electrodes,
wherein the dielectric layers are the dielectric ceramic according to claim 3.

9. The laminated ceramic capacitor according to claim 8, wherein the internal electrodes comprise Ni.

10. The laminated ceramic capacitor according to claim 9 having on its surface a pair of external electrodes comprising Ag, Cu or an alloy thereof.

11. A laminated ceramic capacitor comprising a ceramic sintered body comprising dielectric layers and internal electrodes,
wherein the dielectric layers are the dielectric ceramic according to claim 2.

12. The laminated ceramic capacitor according to claim 11, wherein the internal electrodes comprise Ni.

13. The laminated ceramic capacitor according to claim 12 having on its surface a pair of external electrodes comprising Ag, Cu or an alloy thereof.

14. A laminated ceramic capacitor comprising a ceramic sintered body comprising dielectric layers and internal electrodes,
wherein the dielectric layers are the dielectric ceramic according to claim 1.

15. The laminated ceramic capacitor according to claim 14, wherein the internal electrodes comprise Ni.

16. The laminated ceramic capacitor according to claim 15 having on its surface a pair of external electrodes comprising Ag, Cu or an alloy thereof.

* * * * *